(No Model.)

F. O. BLACKWELL.
MOTOR FOR ELECTRIC CARS.

No. 470,656. Patented Mar. 15, 1892.

WITNESSES:

INVENTOR:
Francis O. Blackwell
by Bentley & Knight
ATTYS.

UNITED STATES PATENT OFFICE.

FRANCIS O. BLACKWELL, OF BOSTON, MASSACHUSETTS, ASSIGNOR TO THE THOMSON-HOUSTON ELECTRIC COMPANY, OF CONNECTICUT.

MOTOR FOR ELECTRIC CARS.

SPECIFICATION forming part of Letters Patent No. 470,656, dated March 15, 1892.

Application filed December 4, 1890. Serial No. 373,544. (No model.)

*To all whom it may concern:*

Be it known that I, FRANCIS O. BLACKWELL, a citizen of the United States, residing at Boston, county of Suffolk, and State of Massachusetts, have invented a certain new and useful Improvement in Electric-Motor Trucks, of which the following is a specification.

The invention hereinafter described relates to an electric-motor truck, and it has been designed with a view to obtaining a construction such that the counter-shaft and intermediate set of reduction-gears now used in railway service may be dispensed with and the armature geared directly to the driven axle. The difficulties attending such a construction are to get a sufficient amount of iron in the motor without making it too tall for the space under the car-body, where it is placed, and, again, to bring the armature near enough to the axle to permit the use of direct gearing without carrying the field-magnets over to the opposite side of the axle. The motor now described is especially well adapted to meet these requirements. It is of the four-pole type, and, briefly stated, consists of a closed field-magnet frame and flat coil-windings surrounding the armature and disposed in recesses in the field-magnet frame. By this arrangement the portions of the field-magnets directly above and below the armature can be made comparatively thin, so that the height of the motor is reduced to a minimum. A neutral portion of the field comes opposite the axle and may be recessed, so as to bring the armature close to the axle without limiting the amount of metal desired for the magnetic circuit. The windings can be removed and replaced with ease. To permit access to the armature the field-magnet frame is made in halves, which can be unbolted and the armature removed without disturbing the hangings of the motor upon the truck.

Figure 1:
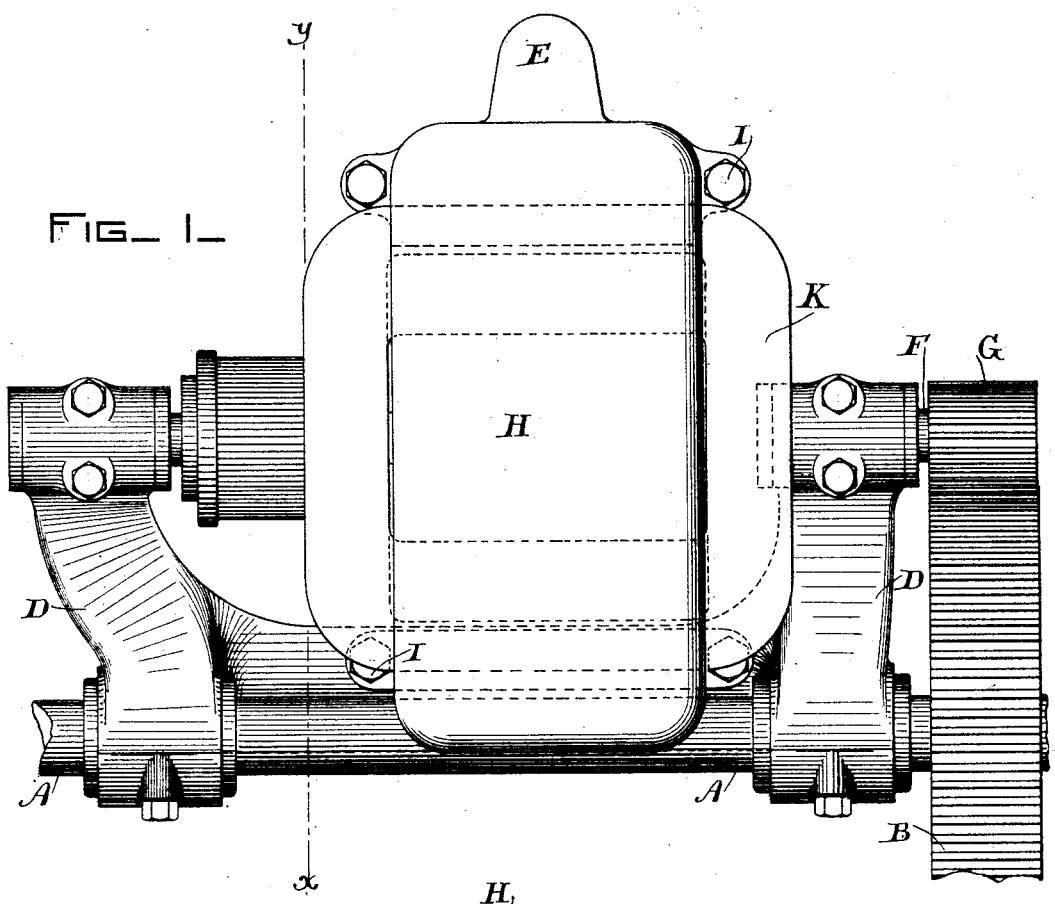
Figure 2:
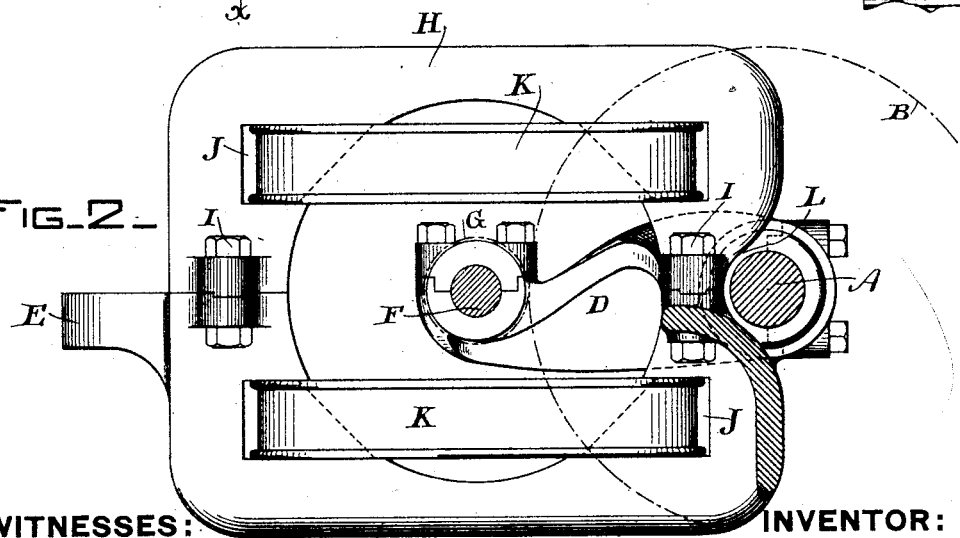

In the accompanying drawings, Figure 1 is a plan view of the motor and truck-axle, and Fig. 2 is a sectional view taken on line $x\ y$ and looking to the right.

In the views, A represents the axle of a car-truck, upon which is fixed a gear-wheel B. The field-magnets of the motor are made in halves, which, when fitted together, form a closed frame. The lower half C is provided with a motor-frame D for journaling the motor to the axle and a bracket E for upholding the free end of the motor from the truck in any desired way. The armature-shaft F is journaled in bearings on the frame D and has a pinion G, which meshes directly with the gear-wheel B, thus furnishing means for propelling the car. The upper half H of the field-magnets fits down over the armature and is bolted to the lower half at I. Above and below the armature the field-magnets are recessed transversely at J, and in the recesses are disposed flat coil-windings K, which surround the armature and may be held in place by any suitable fastening device. Should it become necessary to replace the coils, the old ones may be slipped out endwise and new ones inserted readily, it being understood that the two halves of the field are taken apart, so that the coils may clear the armature.

From the construction described it will be observed that the motor is of the four-pole type and the armature and driven axle are in a horizontal line, dividing poles of like polarity. On this line the metal of the frame can be cut away or made thin without sacrificing the efficiency of the motor, and this is done, as seen at L in Fig. 2, so that the armature may be brought up close to the axle, while above and below the axle the metal is thickened out, as shown. Other parts of the truck may be constructed as heretofore.

What I claim as new, and desire to secure by Letters Patent, is—

1. The combination, with the driven axle of a car-truck, of a four-pole electric motor having its armature geared to the axle and its field-magnets recessed at the dividing polar line receiving the axle, as set forth.

2. The combination of an electric motor geared to the axle of a truck and having flat field-magnets recessed transversely, with coil-windings surrounding the armature, disposed in said recesses, and removable therefrom, as described.

3. The combination, with a car-truck, of a four-pole electric motor centered upon the axle and geared thereto by a single set of reduction-gears and having a closed field-magnet frame and flat coil-windings surrounding the armature, arranged one above the other in a horizontal plane, as described.

4. In an electric-motor truck, the combination of the armature with the field-magnets made up in halves, the lower one provided with means for journaling it to the truck-axle and the upper one fitting down over the armature and attached to the lower, as described.

5. The combination, in an electric-motor truck, of the armature geared to the axle, with the field-magnets having recesses on opposite sides, respectively, of the armature, and the windings disposed in and individually removable from said recesses.

6. The combination of a truck with an electric motor having its field-magnets made up in halves, the lower half being provided with means for journaling it on the axle and supporting it in place and with bearings for the armature-shaft and means for readily attaching or detaching the upper half from the lower half, as set forth.

In witness whereof I have hereto set my hand this 2d day of December, 1890.

FRANCIS O. BLACKWELL.

Witnesses:
A. O. ORNE,
W. M. TWOMBLY.